(12) United States Patent
Mergenthaler

(10) Patent No.: US 8,475,086 B2
(45) Date of Patent: Jul. 2, 2013

(54) TOOL CASSETTE

(75) Inventor: Peter Karl Mergenthaler, Markt Bibart (DE)

(73) Assignee: Kennametal Inc., Latrobe, PA (US)

( * ) Notice: Subject to any disclaimer, the term of this patent is extended or adjusted under 35 U.S.C. 154(b) by 304 days.

(21) Appl. No.: 12/991,243

(22) PCT Filed: May 19, 2009

(86) PCT No.: PCT/EP2009/003533
§ 371 (c)(1),
(2), (4) Date: Jan. 20, 2011

(87) PCT Pub. No.: WO2009/143974
PCT Pub. Date: Dec. 3, 2009

(65) Prior Publication Data
US 2011/0188951 A1    Aug. 4, 2011

(30) Foreign Application Priority Data
May 30, 2008   (DE) .................. 10 2008 026 090

(51) Int. Cl.
*B23C 5/24*    (2006.01)

(52) U.S. Cl.
CPC .......................................... *B23C 5/24* (2013.01)
USPC .................................. 407/36; 407/39; 407/44

(58) Field of Classification Search
USPC ............................. 407/36, 39, 44, 45, 46, 56
IPC ............................................................. B23C 5/24
See application file for complete search history.

(56) References Cited

FOREIGN PATENT DOCUMENTS

| DE | EP 282090 A1 | * | 11/1988 |
|---|---|---|---|
| DE | 3918034 A1 | * | 12/1990 |
| DE | 102005045751 A1 | | 3/2007 |
| EP | 0835709 A1 | | 4/1998 |

OTHER PUBLICATIONS

English machine translation of DE 3918034 A1.*
English machine translation of EP 0282090 A1.*

* cited by examiner

*Primary Examiner* — Daniel Howell
*Assistant Examiner* — Alan Snyder
(74) *Attorney, Agent, or Firm* — Larry R. Meenan, Esq.

(57) ABSTRACT

A tool cassette having a receptacle for an interchangeable cutting insert, wherein at least one setting element for setting the position of the tool cassette with respect to a seat for the cassette of a carrier tool is provided on the tool cassette.

7 Claims, 5 Drawing Sheets

TOOL CASSETTE

BACKGROUND OF THE INVENTION

1. Field of the Invention

The invention relates to a tool cassette for insertion in a carrier tool of a machine tool. Such tool cassettes serve for the application of various exchangeable tools in machine tools. The tool cassette has a receiver for an exchangeable cutting insert. This cutting insert can be configured, for example, as a cutting plate or reversible cutting plate. Together with the cassette, the cutting insert, in turn, is fixed in a cassette seat of a carrier tool. The carrier tool, in turn, is constrained in a machine tool. The tool cassette therefore serves as an indirect receiver for the cutting insert in the carrier tool of the machine tool.

2. Description of the Related Art

Because of this indirect arrangement of the cutting insert in the carrier tool, the possibility of fine adjustment of the cassette in relation to the cassette seat is required. According to the prior art, this settability in the cassette seat is effected by means of clamping elements or intermediate pieces or setting elements fixed to the cassette seat.

Proceeding from the prior art, the invention is based on the object of simplifying a tool cassette in respect of its settability in relation to the cassette seat.

SUMMARY OF THE INVENTION

The achievement of the object consists, according to the invention, in providing at least one setting element on the tool cassette itself, which setting element is suitable for setting, in particular fine-adjusting, the position of the tool cassette in relation to the cassette seat. The related claims contain developments of the invention, some of which are advantageous developments and some of which are developments that are in themselves inventive.

The use of a setscrew as a setting element has the advantage, firstly, that it is possible to use, as levers for adjusting the setscrew, the same screwdrivers or wrenches that are present in standard tool sets in any case. In addition, the adjustment by means of a setscrew is technically easy to manipulate. Finally, a setscrew is also particularly suitable for stepless adjustment. The use of a seating plug connected to the screw prevents the end of the screw from being seated in a point-type manner on the cassette seat. The wide plug, on the other hand, ensures that the setting element is seated flatly and therefore solidly, and in a manner that distributes the pressure, on a mating face of the cassette seat.

The path guide provided in a further design serves to secure the seating plug against rotation. In this way, an invariably defined position of the seating plug in relation to the corresponding mating faces on the cassette seat is ensured.

The mounting of the setscrew such that it can be screwed in a fixed threaded bush additionally simplifies the structure of the tool cassette. Moreover, it is possible to provide a retaining groove in the outer face of the threaded bush. By means of this retaining groove, the threaded bush can be held on the tool cassette in a simple manner. For example, two pins extending in parallel can engage in two mutually opposite regions of the groove and thus secure the threaded bush on the tool cassette in such a manner that it is easy to mount and is also exchangeable.

In a particular embodiment of the invention, it is provided that the thread pitch of the setscrew is selected that a full turn of the setscrew corresponds to a predefined setting step. In the region of the screw head, corresponding indicators, for example marking scales or marking lines, can be provided, which indicate to the user the completion of a complete turn of the setscrew. For example, the predefined step can be 0.05 mm. With each complete turn of the setscrew, the cassette then alters its position in relation to the cassette seat by the measure of 0.05 mm in the direction of action of the respective setscrew.

It is usually required that the tool cassette be moved translationally in relation to the cassette seat. For this, the respective setscrews can extend perpendicularly through the body of the tool cassette. The central longitudinal axis of the setscrew then runs in the required adjustment direction. In another design, however, it is also possible for the setscrew to extend obliquely through the body of the tool cassette. In the case of this embodiment, the seating plug is designed in the shape of a wedge. The wedge angle of the seating plug in this case is matched to the oblique angle of the setscrew in the tool cassette in such a way that the seating face of the seating plug on the cassette seat ultimately again executes a translational movement.

In an advantageous design, to enable larger faces of a tool cassette to be set reliably in relation to the corresponding mating face in the cassette seat, a plurality of setting elements can be provided. The latter are moved synchronously, in order to ensure a constant adjusting of all setting elements in relation to the corresponding mating face of the cassette seat.

It is advantageous to be able to operate all setting elements, in particular all setscrews, from one side of the cassette. This is particularly advantageous if the cassette seat is closed from a plurality of sides. It is then not necessary for the cassette to be repeatedly removed from the cassette seat of the carrier tool before setting for the purpose of fine adjustment.

BRIEF DESCRIPTION OF THE DRAWINGS

The invention is explained further with reference to an exemplary embodiment represented in the figures of the drawing, wherein.

DETAILED DESCRIPTION OF THE INVENTION

Figure 1:
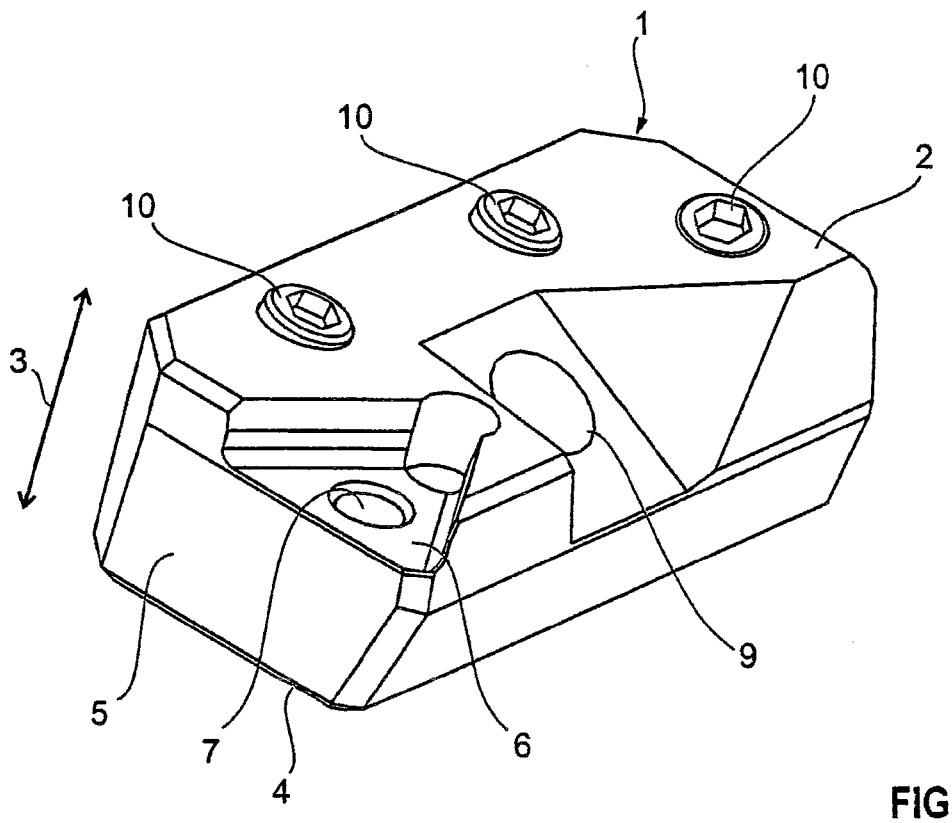
FIG. 1 shows a perspective view of a tool cassette that can be operated from the top side thereof.

In the exemplary embodiment, the tool cassette 1 is a prismatic, substantially rectangular parallelepiped type body. The one large rectangular parallelepiped face of the tool cassette 1 constitutes its top side 2. Facing away from the top side 2 in the adjustment direction 3 is the underside 4 of the tool cassette 1. The underside 4 is constituted by the second large rectangular parallelepiped face.

On the top side 2, the receiver 6 for a cutting insert is left free in the region of the one narrow side 5 of the rectangular parallelepiped. In the exemplary embodiment, it is a triangular receiver for a triangular cutting plate or reversible cutting plate. For the purpose of fixing the cutting insert, not shown in the exemplary embodiment, a fixing bore 7 extends through the receiver 6. A fastening means can be inserted in the fixing bore 7 for the purpose of fastening the cutting insert.

In the cassette longitudinal direction 8 running at right angles to the adjustment direction 3, a retaining opening 9 is provided next to the receiver 6. The retaining opening 9 extends through the tool cassette 1 in the adjustment direction 3. A fastening bolt or other type of fastening means can be inserted in the retaining opening 9 for the purpose of fastening the tool cassette 1 in the cassette seat of the carrier tool, which cassette seat is not represented in the drawings.

Finally, the screw heads 10 of the setscrews 11 can still be seen on the top side 2 of the tool cassette 1. Sunk into each of the screw heads 10 is a hexagon socket, as an application point for a tool having an outer contour of correspondingly complementary design.

Two insertion bores 12 are provided in the narrow side 5' that faces away from the narrow side 5 having the receiver 6 for the cutting insert. Likewise, four such insertion bores are provided on the broad side 13 of the tool cassette 1 that connects the narrow sides 5, 5'. Retaining pins 14 can be inserted in the insertion bores 12. In the final mounted state, the retaining pins 14 engage in two mutually opposite regions of retaining grooves 15 that are shaped into the outer faces of the threaded bushes 16. By means of the retaining pins 14, the threaded bushes 16 are fixed in a stationary manner in corresponding receiving slots in the tool cassette 1.

Figure 2:
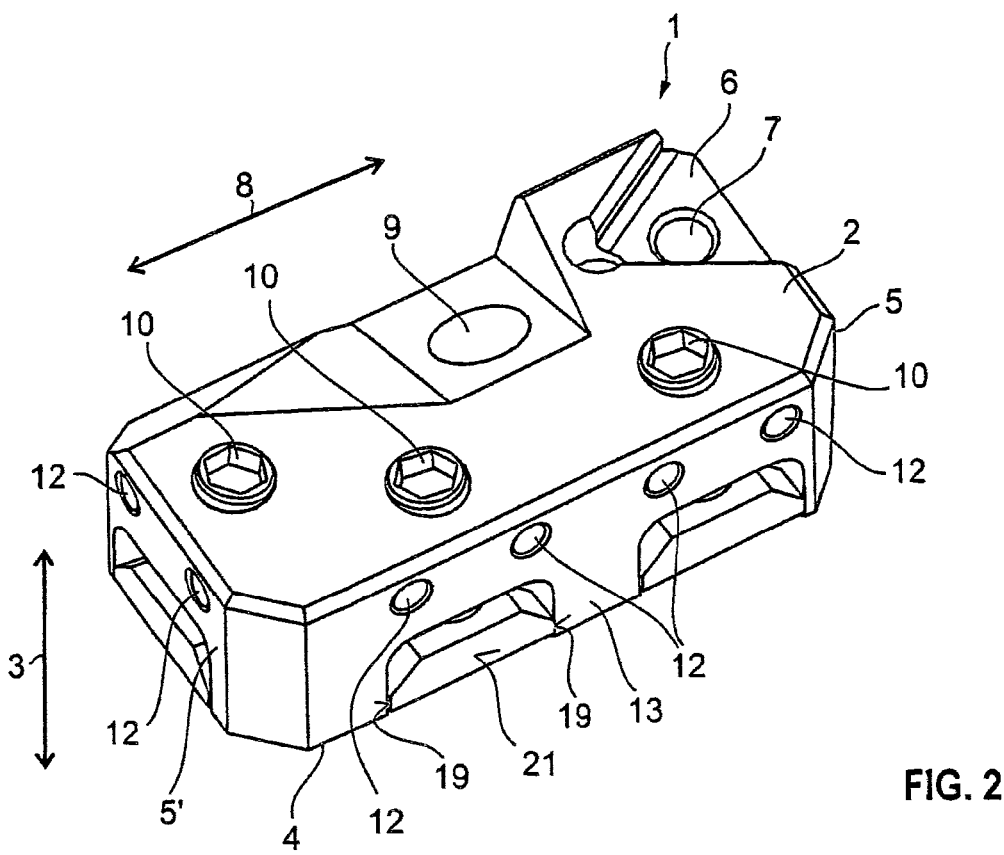
FIG. 2 shows a perspective view of the tool cassette represented in FIG. 1, turned by 180° relative to FIG. 1.
Figure 3:
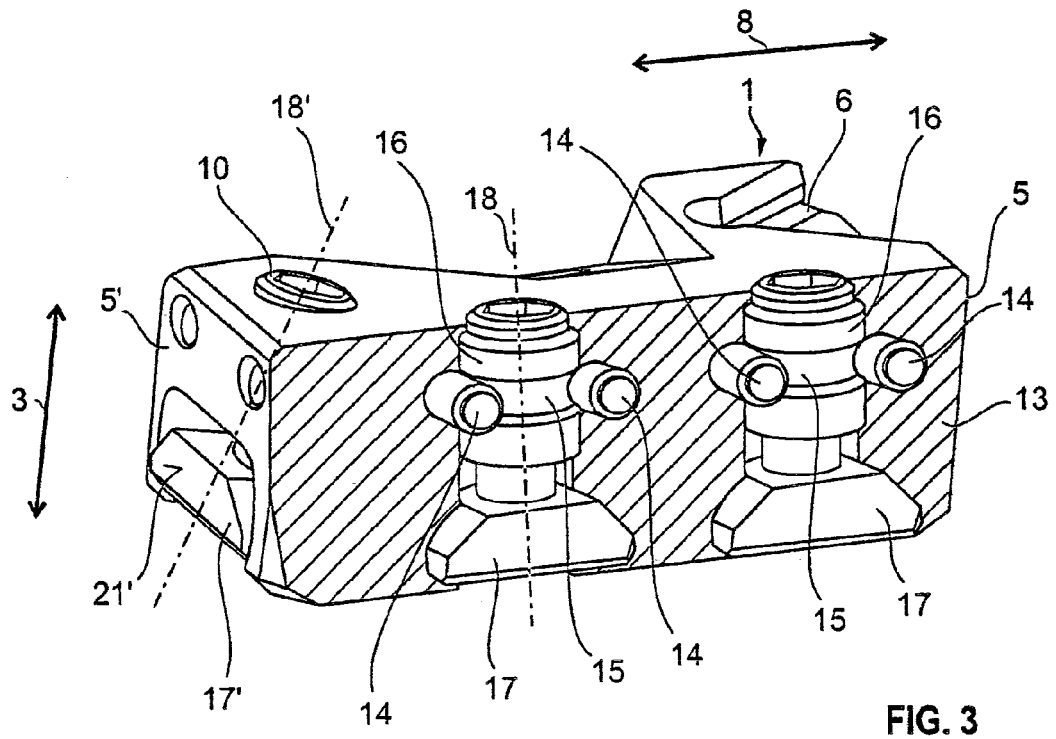
FIG. 3 shows a perspective side view of the tool cassette with an opened side wall.
Figure 4:
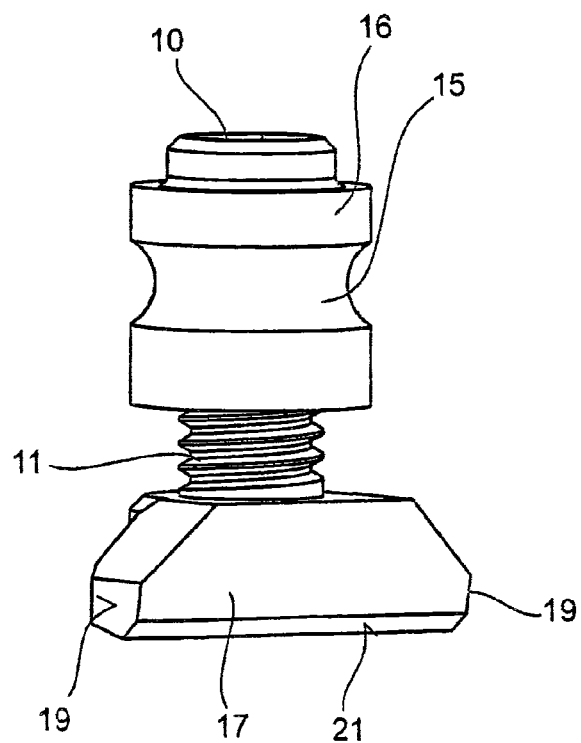
FIG. 4 shows a setscrew extending through the tool cassette in the perpendicular direction, in the fitted state, with an attached threaded bush and an attached seating plug.
Figure 6:
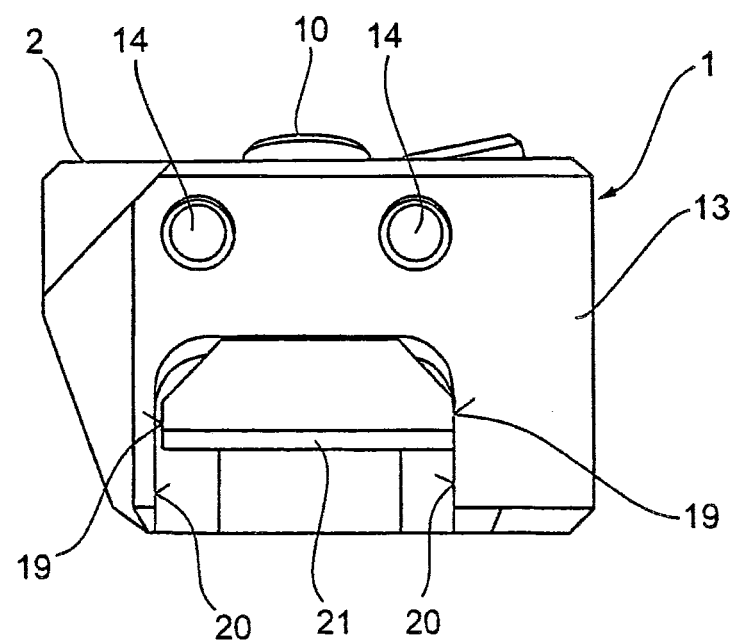
FIG. 6 shows the setting screw shown in FIG. 4, in a fully deactivated position.
Figure 7:
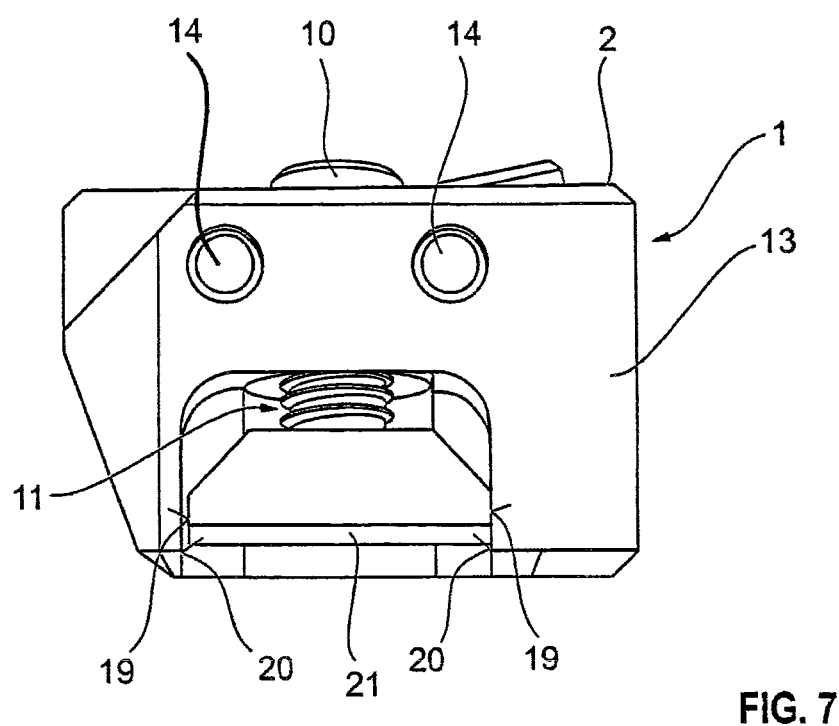
FIG. 7 shows the setting screw represented in FIG. 6, in a pre-screwed position.

The setscrews 11, in turn, are screwed into the threaded bushes 16. At their ends that face away from the screw heads 10, the setscrews 11 each carry the seating plugs 17, 17'. The setscrews 11, which, in the representation of FIG. 2 and FIG. 3, are arranged in the region of the broad side 13 and have their seating plugs 17, extend perpendicularly through the body of the tool cassette 1, namely, in the adjustment direction 3. The central longitudinal axis 18 of these setscrews 11 thus likewise runs in the adjustment direction 3. As is clearly evident from FIGS. 6 and 7, the seating plugs 17 are guided, by means of their lateral faces 19, on guide faces 20 of the receiving slot for the respective setscrew 11 and the respective seating plug 17. The lateral faces 19 and the guide faces 20 thus constitute a path guide. The seating face 21 of the seating plugs 17 runs at right angles to the lateral faces 19. By means of their seating face 21, the seating plugs 17, when in the final mounted state, lie on the corresponding mating face of the cassette seat. It can additionally be seen from the representation of FIG. 2 and FIG. 3 that, in the final mounted state, the seating plugs 17 assigned to the broad side 13 bear on the same mating face of the cassette seat. The setscrews 11 having the seating plugs 17 are designed only for synchronous adjustment. This means that both setscrews 11 must always be adjusted by the same adjustment distance, i.e. by the same number of turns in relation to the body of the tool cassette 1.

Finally, in the case of the exemplary embodiment, the thread pitch of the setscrews 11 is also so selected that a full turn of each setscrew 11, or of each screw head 10, is equivalent to an adjustment of the seating faces 21 of the seating plugs 17 by 0.05 mm. The application of marking lines by means of laser inscription provides for scaled setting.

Figure 5:
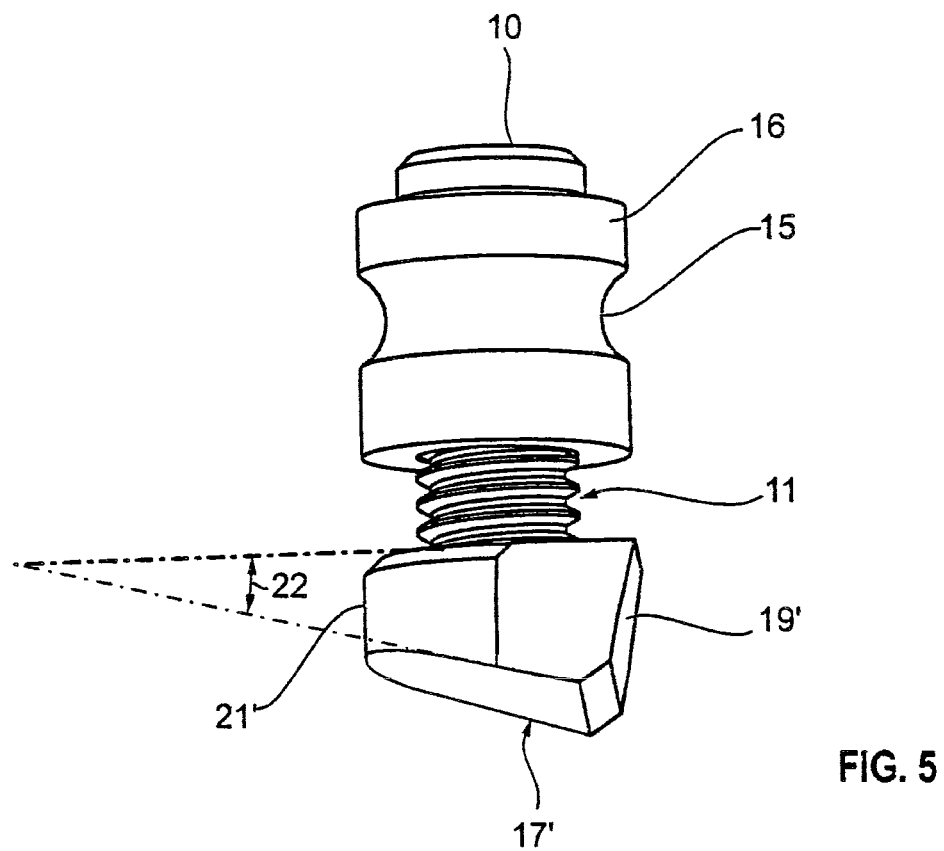
FIG. 5 shows a setscrew extending obliquely through the tool cassette, in the fitted state, with a wedge-shaped plug and with an already adapted threaded bush.

The seating plug 17', which is arranged on the narrow side 5' and shown yet again in FIG. 5, functions differently. It can be seen from the representation of FIG. 3 that the central longitudinal axis 18' of the setscrew 11 assigned to the seating plug 17' runs obliquely in relation both to the adjustment direction 3 and to the cassette longitudinal direction 8. The seating face 21' of the seating plug 17' is also not arranged on the side that faces away from the screw head 10. Rather, the seating face 21' is arranged laterally on the seating plug 17', as can be seen from the representation of FIG. 5. This is because the seating plug 17' is wedge-shaped. For this, it has the wedge angle 22. By means of its lateral face 19', the seating plug 17' is so guided in its receiving slot that, as the screw head 10 is screwed-in in the cassette longitudinal direction 8, it projects ever further from the narrow side 5' of the tool cassette 1, in order to displace the tool cassette 1 in relation to the cassette seat, not represented, in the carrier tool in the cassette longitudinal direction 8.

Finally, from viewing of the figures of the drawing in combination, in particular from viewing of FIG. 1 and FIG. 2 in combination, it can be seen that all screw heads 10 of all setscrews 11 can be operated from the top side 2. The top side 2 is therefore simultaneously the operating side of the tool cassette 1.

Figure 8:
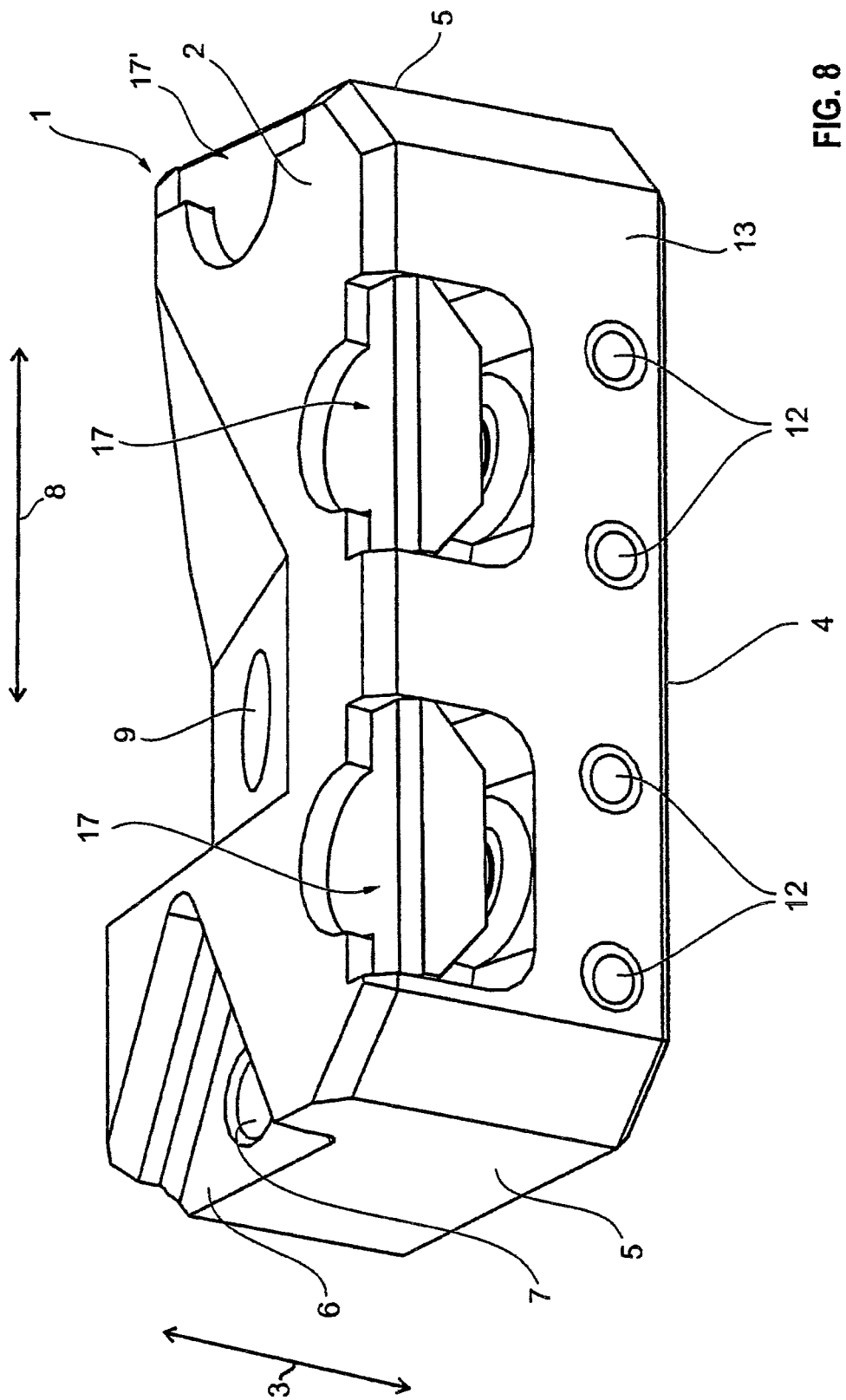
FIG. 8 shows a perspective view of a tool cassette that can be operated from the underside thereof.

FIG. 8 shows a further variant of the tool cassette 1 according to the invention. In the case of this variant, the underside 4 constitutes the operating side. Whilst the receiver 6 for the cutting insert and the retaining opening 9 for the introduction of a fastening means for the tool cassette 1 on the carrier tool continue to be arranged on the top side 2, the screw heads 10 of the setscrews 11 are arranged on the underside 4, and are not visible in FIG. 8. Corresponding to the screw heads 10 arranged on the underside 4, in the case of the embodiment shown in FIG. 8 the seating plugs 17, 17' are arranged in the region of the top side 2. It is therefore possible, according to the invention, to realize a tool cassette that can be operated both from the top side 2 and 1 from the underside 4. An advantage of the embodiment represented in FIG. 8, having setscrews 11 that can be operated from the underside 4, is the fact that the seating plugs 17 are located at the same level as the cutter in the cutting insert that is inserted in the receiver 6. The fine adjustment of the tool cassette 1 is therefore effected very close to the cutting insert, and thus very close to the working location of the carrier tool with the workpiece to be machined.

The invention claimed is:

1. A tool cassette comprising a receiver for an exchangeable cutting insert and at least one setting element on the tool cassette, for the purpose of setting the position of the tool cassette in relation to a cassette seat of a carrier tool, wherein the at least one setting element comprises a setscrew having, fixed to the end of the setscrew, a seating plug as a seating face in relation to the cassette seat, wherein the tool cassette further comprises a path guide having at least two guide faces, on which respectively one lateral face of the seating plug is guided in a sliding manner.

2. The tool cassette as claimed in claim 1, further including a fixed threaded bush, in which the setscrew is movably mounted such that it can be screwed.

3. The tool cassette as claimed in claim 1, wherein the setscrew has a thread pitch such that a full turn of the setscrew corresponds to a predefined setting step of the setting element.

4. The tool cassette as claimed in claim 1, wherein the setscrew extends perpendicularly through the body of the tool cassette.

5. The tool cassette as claimed in claim 1, wherein the setscrew extends at an oblique angle through the body of the tool cassette, and the seating plug is wedge-shaped and has a wedge angle matched to the oblique angle for the purpose of realizing a translational movement of the seating face of the seating plug in relation to the tool cassette.

6. The tool cassette as claimed in claim 1, comprising two or more synchronously movable setting elements for constant adjustment of the position of the tool cassette in relation to a mating seating face of the cassette seat.

7. The tool cassette as claimed in claim 1, wherein all setting elements can be operated from one side of the tool cassette.

* * * * *